US009979928B2

(12) United States Patent
He

(10) Patent No.: US 9,979,928 B2
(45) Date of Patent: May 22, 2018

(54) INTERNET INTERFACE PROTECTION CIRCUIT AND TELEVISION

(71) Applicant: SHENZHEN TCL DIGITAL TECHNOLOGY LTD., Shenzhen, Guangdong (CN)

(72) Inventor: Shunliang He, Guangdong (CN)

(73) Assignee: SHENZHEN TCL DIGITAL TECHNOLOGY LTD., Shenzhen, Guangdong (CN)

( * ) Notice: Subject to any disclaimer, the term of this patent is extended or adjusted under 35 U.S.C. 154(b) by 0 days. days.

(21) Appl. No.: 15/536,141

(22) PCT Filed: Dec. 25, 2014

(86) PCT No.: PCT/CN2014/094992
§ 371 (c)(1),
(2) Date: Jun. 15, 2017

(87) PCT Pub. No.: WO2016/095255
PCT Pub. Date: Jun. 23, 2016

(65) Prior Publication Data
US 2017/0366781 A1    Dec. 21, 2017

(30) Foreign Application Priority Data

Dec. 17, 2014  (CN) .......................... 2014 1 0790006

(51) Int. Cl.
*H04N 7/173* (2011.01)
*H04N 7/10* (2006.01)
(Continued)

(52) U.S. Cl.
CPC ............ *H04N 7/102* (2013.01); *H02H 9/045* (2013.01); *H04N 7/106* (2013.01); *H04N 21/615* (2013.01); *H04N 21/6175* (2013.01)

(58) Field of Classification Search
CPC ...... H04N 7/102; H04N 7/106; H04N 21/615; H04N 21/6175; H04N 7/173; H02H 9/045
(Continued)

(56) References Cited

U.S. PATENT DOCUMENTS 6,452,938 B1 * 9/2002 Fawal .................... H04L 43/50
370/463
6,916,206 B2 * 7/2005 Ferentz ............. H01R 13/6658
439/620.01
(Continued)

FOREIGN PATENT DOCUMENTS

CN              101630838 A      1/2010

*Primary Examiner* — Trang U Tran
(74) *Attorney, Agent, or Firm* — Winston Hsu

(57) ABSTRACT

The present disclosure provides an internet interface circuit, which includes an ethernet interface, a first isolating transformer, a second isolating transformer, a network signal processing chip and a first interference defending circuit; the ethernet interface is used for receiving and sending a network signal; the first isolating transformer is used for separating a receiving data end of the ethernet interface from the network signal receiving chip; the second isolating transformer is used for separating a sending data end of the ethernet interface from the network signal receiving chip; the first interference defending circuit is used for defending common-mode interference and differential-mode interference of the receiving data end of the ethernet interface; the network signal processing chip is used for processing the network signal. The present disclosure also provides a television. The internet interface protecting circuit of the present disclosure can defend the common-mode interference and differential-mode interference.

16 Claims, 2 Drawing Sheets

(51) Int. Cl.
*H02H 9/04* (2006.01)
*H04N 21/61* (2011.01)

(58) Field of Classification Search
USPC .................................. 348/725, 730; 725/127
See application file for complete search history.

(56) References Cited

U.S. PATENT DOCUMENTS 7,797,558 B2 * 9/2010 Ghoshal .................. H04L 12/10
713/310
9,197,423 B2 * 11/2015 Crawley .................. H04L 12/10

* cited by examiner

INTERNET INTERFACE PROTECTION CIRCUIT AND TELEVISION

FIELD OF THE DISCLOSURE

The present disclosure relates to the field of electronic technique, and in particular, to an internet interface protecting circuit and a television.

BACKGROUND OF THE DISCLOSURE

With the rapid development of the internet technology, the internet television having internet interface is popularized gradually, user can browse the web, watch television and enjoy the movies, and so on, online on the television by inserting a cable in the television. However, when user uses a long cable outside (such as, the user interfaces a broadband network from neighbor to indoor), as too long cable is exposed to outdoor, when on a lightning day, lightning may induct the cable to produce large common-mode interference voltage and differential-mode interference voltage, the large common-mode interference voltage and the differential-mode interference voltage can affect, or even damage, a network signal processing chip in the internet interface circuit in the television, therefore affecting, or even damaging the network function of the television.

FIG. 1 is a circuit structure diagram of an existing internet interface circuit provided by an exemplary embodiment. Referring to FIG. 1, the internet interface circuit includes an ethernet interface 101, a first isolating transformer T11, a second isolating transformer T12, a network signal processing chip 102, a resistor R11, a resistor R12 and a capacitor C11. Wherein, the ethernet interface 101 is used for receiving and sending a network signal; the first isolating transformer T11 is used for separating a receiving data end of the ethernet interface 101 from the network signal receiving chip 102; the second isolating transformer T12 is used for separating a sending data end of the ethernet interface 101 from the network signal receiving chip 102; the network signal processing chip 102 is used for processing the network signal. In detail, a positive end RX+ of the receiving data end of the ethernet interface 101 is connected with a first end of a second primary coil of the first isolating transformer T11, a negative end RX− of the receiving data end of the ethernet interface 101 is connected with a first end of a first primary coil of the first isolating transformer T11; a second end of the first primary coil of the first isolating transformer T11 and a second end of the second primary coil of the first isolating transformer T11 are both connected with a first end of the capacitor C11 through the resistor R11; a second end of the capacitor C11 is earthed; a positive end TX+ of a sending data end of the ethernet interface 101 is connected with a first end of a fourth primary coil of the second isolating transformer T12, a negative end TX− of the sending data end of the ethernet interface 101 is connected with a first end of a third primary coil of the second isolating transformer T12; a second end of the third primary coil of the second isolating transformer T12 and a second end of a fourth primary coil of the second isolating transformer T12 are both connected with the first end of the capacitor C11 through the resistor R12; a first end of a secondary coil of the first isolating transformer T11 is connected with a receiving data negative end RX1− of the network signal processing chip 102, a second end of the secondary coil of the first isolating transformer T11 is connected with a receiving data positive end RX1+ of the network signal processing chip 102; a first end of a secondary coil of the second isolating transformer T12 is connected with a sending data negative end TX1− of the network signal processing chip 102, a second end of the secondary coil of the second isolating transformer T12 is connected with a sending data positive end TX1+ of the network signal processing chip 102. In addition, the receiving data negative end RX1− of the network signal processing chip 102 defines a static defending circuit 1021, the receiving data positive end RX1+ of the network signal processing chip 102 defines a static defending circuit 1022, the sending data positive end TX1+ of the network signal processing chip 102 defines a static defending circuit 1023, the sending data positive end TX1+ of the network signal processing chip 102 defines a static defending circuit 1024. Wherein, the static defending circuit 1021 includes a diode D11 and a diode D12 (the diode D11 and diode D12 are both diodes having very small stray capacitance). Wherein, a cathode of the diode D11 is connected with a working voltage input end VCC1 of the network signal processing chip 102, an anode of the diode D11 is connected with the receiving data negative end RX1− of the network signal processing chip 102 and a cathode of the diode D12 respectively; an anode of the diode D12 is earthed; the static defending circuit 1022 includes a diode D13 and a diode D14 (the diode D13 and diode D14 are both diodes having very small stray capacitance). Wherein, a cathode of the diode D13 is connected with the working voltage input end VCC1 of the network signal processing chip 102, an anode of the diode D13 is connected with the receiving data positive end RX1+ of the network signal processing chip 102 and a cathode of the diode D14 respectively; an anode of the diode D14 is earthed; the static defending circuit 1023 includes a diode D15 and a diode D16 (the diode D15 and diode D16 are both diodes having very small stray capacitance). Wherein, a cathode of the diode D15 is connected with the working voltage input end VCC1 of the network signal processing chip 102, an anode of the diode D15 is connected with the sending data negative end TX1− of the network signal processing chip 102 and a cathode of the diode D16 respectively; an anode of the diode D16 is earthed; the static defending circuit 1024 includes a diode D17 and a diode D18 (the diode D17 and diode D18 are both diodes having very small stray capacitance). Wherein, a cathode of the diode D17 is connected with the working voltage input end VCC1 of the network signal processing chip 102, an anode of the diode D17 is connected with the sending data positive end TX1+ of the network signal processing chip 102 and a cathode of the diode D18 respectively; an anode of the diode D18 is earthed.

Referring to FIG. 1, if when a common-mode interference voltage is applied to the signal cables of the positive end RX+ of the receiving data end, the negative end RX− of the receiving data end, the positive end TX+ of a sending data end, the negative end TX− of the sending data end of the ethernet interface 101, even the static defending circuit 1021, the static defending circuit 1022, the static defending circuit 1023, the static defending circuit 1024 in the network signal processing chip 102 have a certain defending effect against the common-mode interference voltage, but if the common-mode interference voltage is large enough, the large enough common-mode interference voltage can breakdown the first isolating transformer T11 and the second isolating transformer T12, then affect, even damage, the network signal processing chip 102, therefore affecting, even damaging, the network function of the television; supposing that the signal cable of the positive end RX+ of the receiving data end and the signal cable of the negative end RX− of the receiving data end of the ethernet interface 101 are interfered by differential-mode voltages which have opposite phases respectively, a large differential-mode current will occur between the two signal cables, the differential-mode current will flow from a primary side to a secondary side of the first isolating transformer T11, then affect, even damage, the network signal processing chip 102; similarly, if the signal cable of the positive end TX+ of the sending data end and the signal cable of the negative end TX− of the sending data end of the ethernet interface 101 are interfered by differential-mode voltages which have opposite phases respectively, another large differential-mode current will occur between the two signal cables, the differential-mode current will flow from a primary side to a secondary side of the second isolating transformer T12, also affect, even damage, the network signal processing chip 102, therefore affecting, even damaging, the network function of the television.

SUMMARY OF THE DISCLOSURE

The main aim of the present disclosure is to provide a low cost internet interface protecting circuit which can defend the common-mode interference and differential-mode interference.

In order to achieve the above aim, the present disclosure provides an internet interface protecting circuit, which includes an ethernet interface, a first isolating transformer, a second isolating transformer, a network signal processing chip and a first interference defending circuit; wherein, the ethernet interface, is used for receiving and sending a network signal;

the first isolating transformer, is used for separating a receiving data end of the ethernet interface from the network signal receiving chip;

the second isolating transformer, is used for separating a sending data end of the ethernet interface from the network signal receiving chip;

the first interference defending circuit, is used for defending common-mode interference and differential-mode interference of the receiving data end of the ethernet interface;

the network signal processing chip, is used for processing the network signal;

the receiving data end of the ethernet interface is connected with a primary side of the first isolating transformer; the first interference defending circuit is connected between a secondary side of the first isolating transformer and the network signal receiving chip; the sending data end of the ethernet interface is connected with a primary side of the second isolating transformer; a secondary side of the second isolating transformer is connected with the network signal processing chip.

Preferably, the first interference defending circuit includes a first catching diode, a second catching diode, a first resistor and a second resistor; wherein, an anode of the first catching diode and an anode of the second catching diode are both earthed; a cathode of the first catching diode is connected with a first end of a secondary side coil of the first isolating transformer; a cathode of the second catching diode is connected with a second end of the secondary side coil of the first isolating transformer; the cathode of the first catching diode is also connected with a receiving data negative end of the network signal processing chip through the first resistor; the cathode of the second catching diode is also connected with a receiving data positive end of the network signal processing chip through the second resistor.

Preferably, the internet interface protecting circuit further includes a second interference defending circuit which is used for defending common-mode interference and differential-mode interference of the sending data end of the ethernet interface; the second interference defending circuit is connected between the secondary side of the second isolating transformer and the network signal receiving chip.

Preferably, the second interference defending circuit includes a third catching diode, a fourth catching diode, a third resistor and a fourth resistor; wherein, an anode of the third catching diode and an anode of the fourth catching diode are both earthed; a cathode of the third catching diode is connected with a first end of a secondary side coil of the second isolating transformer; a cathode of the fourth catching diode is connected with a second end of the secondary side coil of the second isolating transformer; the cathode of the third catching diode is also connected with a sending data negative end of the network signal processing chip through the third resistor; the cathode of the fourth catching diode is also connected with a sending data positive end of the network signal processing chip through the fourth resistor.

Preferably, the internet interface protecting circuit further includes a fifth resistor, a sixth resistor and a first capacitor; a primary side coil of the first isolating transformer includes a first primary coil and a second primary coil; a primary side coil of the second isolating transformer includes a third primary coil and a fourth primary coil; wherein, a positive end of the receiving data end of the ethernet interface is connected with a first end of the second primary coil, a negative end of the receiving data end of the ethernet interface is connected with a first end of the first primary coil; a second end of the first primary coil and a second end of the second primary coil are both connected with a first end of the first capacitor through the fifth resistor; a second end of the first capacitor is earthed;

a positive end of the sending data end of the ethernet interface is connected with a first end of the fourth primary coil, a negative end of the sending data end of the ethernet interface is connected with a first end of the third primary coil; a second end of the third primary coil and a second end of the fourth primary coil are both connected with the first end of the first capacitor through the sixth resistor.

Preferably, the receiving data negative end of the network signal processing chip defines a first static defending circuit; the first static defending circuit includes a first diode and a second diode; wherein, a cathode of the first diode is connected with a working voltage input end of the network signal processing chip, an anode of the first diode is connected with the receiving data negative end of the network signal processing chip and a cathode of the second diode respectively; an anode of the second diode is earthed.

Preferably, the receiving data positive end of the network signal processing chip defines a second static defending circuit; the second static defending circuit includes a third diode and a fourth diode; wherein, a cathode of the third diode is connected with the working voltage input end of the network signal processing chip, an anode of the third diode is connected with the receiving data positive end of the network signal processing chip and a cathode of the fourth diode respectively; an anode of the fourth diode is earthed.

Preferably, the sending data negative end of the network signal processing chip defines a third static defending circuit; the third static defending circuit includes a fifth diode and a sixth diode; wherein, a cathode of the fifth diode is connected with the working voltage input end of the network signal processing chip, an anode of the fifth diode is connected with the sending data negative end of the network signal processing chip and a cathode of the sixth diode respectively; an anode of the sixth diode is earthed.

Preferably, the sending data positive end of the network signal processing chip defines a fourth static defending circuit; the fourth static defending circuit includes a seventh diode and a eighth diode; wherein, a cathode of the seventh diode is connected with the working voltage input end of the network signal processing chip, an anode of the seventh diode is connected with the sending data positive end of the network signal processing chip and a cathode of the eighth diode respectively; an anode of the eighth diode is earthed.

In addition, in order to achieve the above aim, the present disclosure also provides a television, which includes an internet interface protecting circuit, the internet interface protecting circuit includes an ethernet interface, a first isolating transformer, a second isolating transformer, a network signal processing chip and a first interference defending circuit; wherein, the ethernet interface, is used for receiving and sending a network signal;

the first isolating transformer, is used for separating a receiving data end of the ethernet interface from the network signal receiving chip;

the second isolating transformer, is used for separating a sending data end of the ethernet interface from the network signal receiving chip;

the first interference defending circuit, is used for defending common-mode interference and differential-mode interference of the receiving data end of the ethernet interface;

the network signal processing chip, is used for processing the network signal;

the receiving data end of the ethernet interface is connected with a primary side of the first isolating transformer; the first interference defending circuit is connected between a secondary side of the first isolating transformer and the network signal receiving chip; the sending data end of the ethernet interface is connected with a primary side of the second isolating transformer; a secondary side of the second isolating transformer is connected with the network signal processing chip.

The internet interface protecting circuit provided by the present disclosure includes an ethernet interface, a first isolating transformer, a second isolating transformer, a network signal processing chip and a first interference defending circuit; the ethernet interface is used for receiving and sending a network signal; the first isolating transformer is used for separating a receiving data end of the ethernet interface from the network signal receiving chip; the second isolating transformer is used for separating a sending data end of the ethernet interface from the network signal receiving chip; the first interference defending circuit is used for defending common-mode interference and differential-mode interference of the receiving data end of the ethernet interface; the network signal processing chip is used for processing the network signal; the receiving data end of the ethernet interface is connected with the primary side of the first isolating transformer; the first interference defending circuit is connected between the secondary side of the first isolating transformer and the network signal receiving chip; the sending data end of the ethernet interface is connected with the primary side of the second isolating transformer; the secondary side of the second isolating transformer is connected with the network signal processing chip. The internet interface protecting circuit of the present disclosure can defend the common-mode interference and differential-mode interference; and the cost of the internet interface protecting circuit of the present disclosure is low; simultaneously, the present disclosure also has the advantages of simple circuit structure, and easily to be achieved.

The realizing of the aim, functional characteristics, advantages of the present disclosure are further described in detail with reference to the accompanying drawings and the embodiments.

DETAILED DESCRIPTION OF THE EMBODIMENTS

It is to be understood that, the described embodiments are only some exemplary embodiments of the present disclosure, and the present disclosure is not limited to such embodiments.

The present disclosure provides an internet interface protecting circuit.

Figure 1:
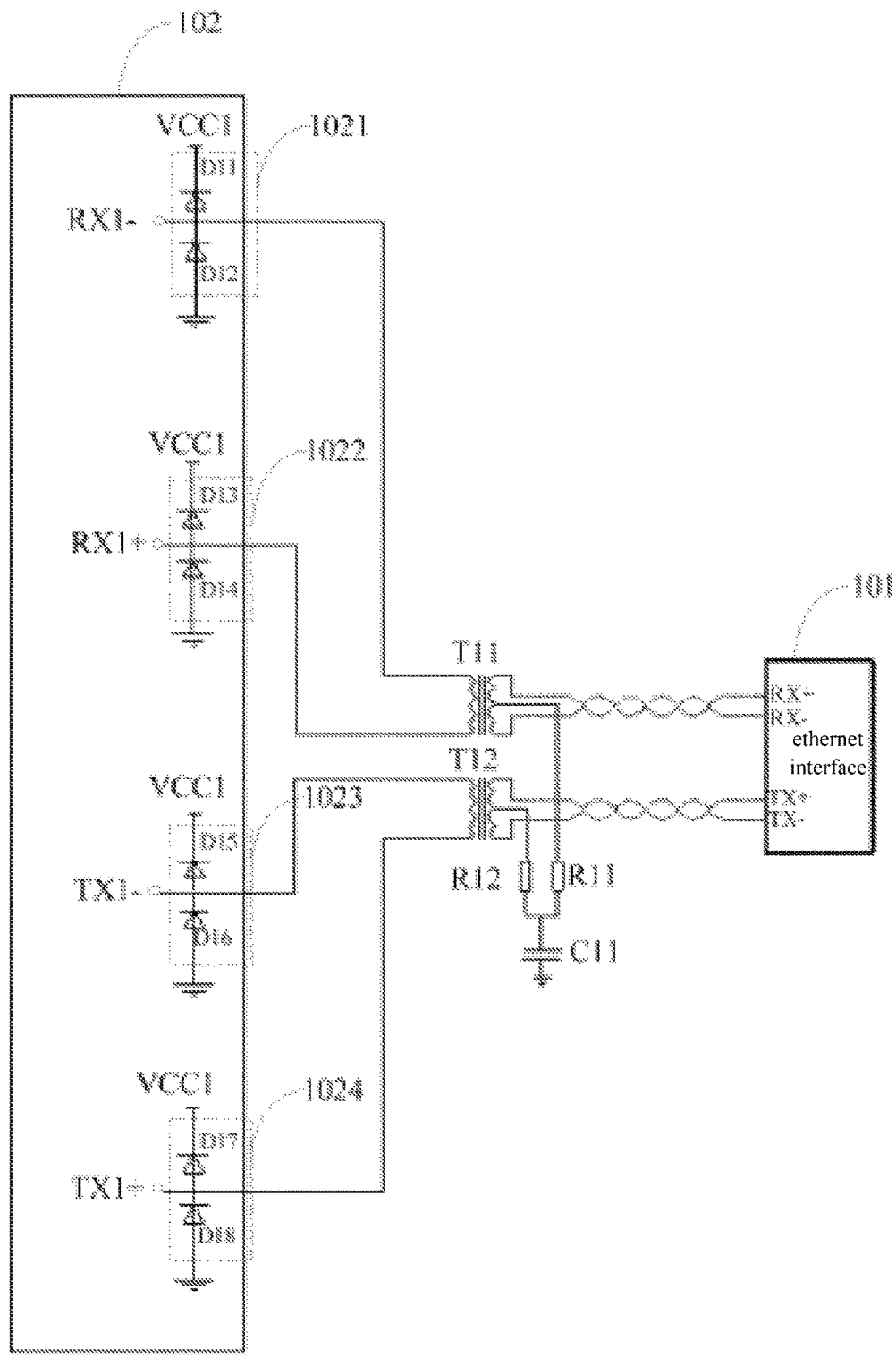
FIG. 1 is a circuit structure diagram of an existing internet interface circuit.
Figure 2:
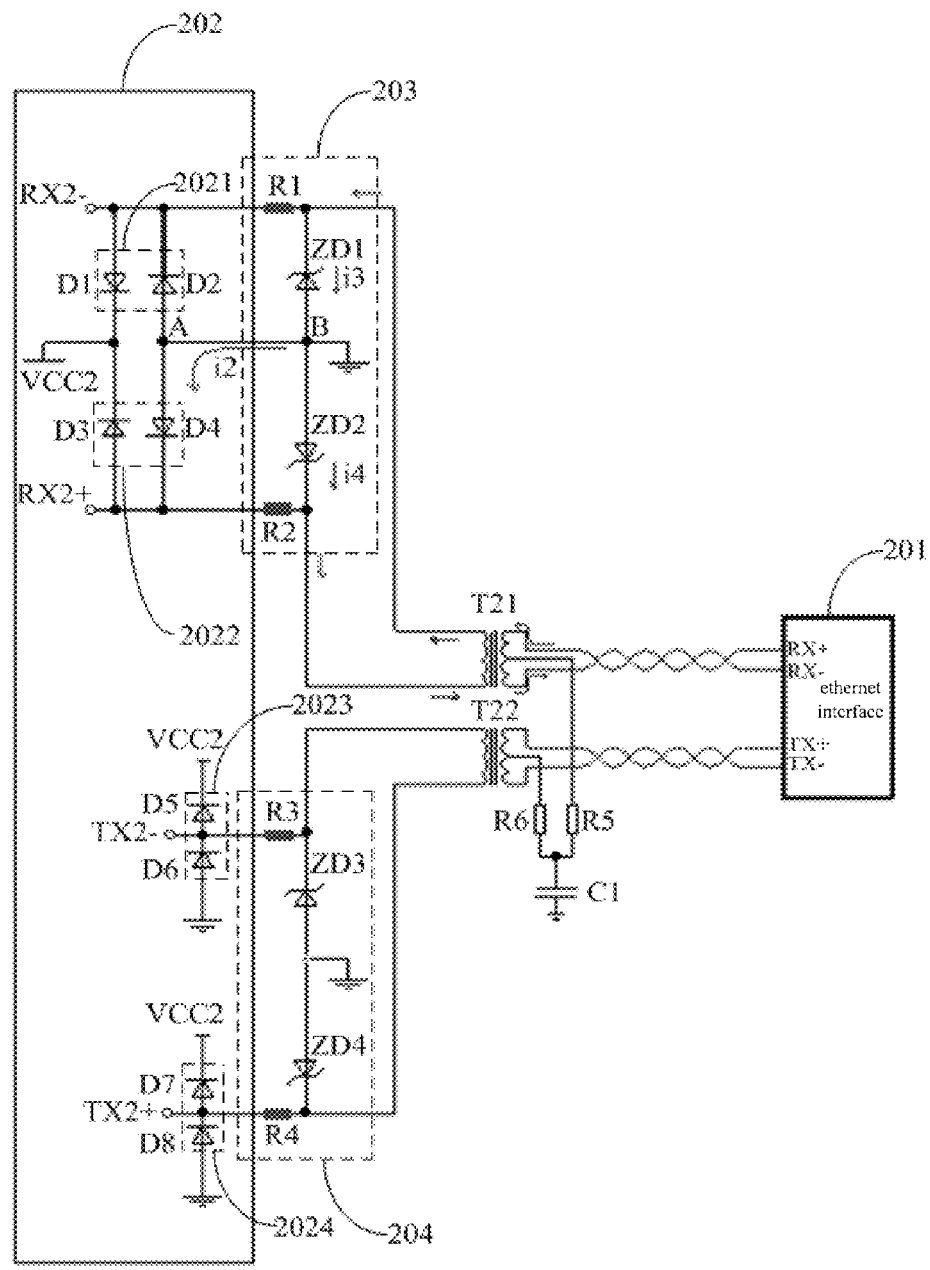
FIG. 2 is a circuit structure diagram of an internet interface protecting circuit provided by an exemplary embodiment of the present disclosure.

Referring to FIG. 2, FIG. 2 is a circuit structure diagram of an internet interface protecting circuit provided by an exemplary embodiment of the present disclosure.

In an exemplary embodiment, the internet interface protecting circuit includes an ethernet interface 201, a first isolating transformer T21, a second isolating transformer T22, a network signal processing chip 202, a first interference defending circuit 203 and a second interference defending circuit 204.

Wherein, the ethernet interface 201, is used for receiving and sending a network signal; in an exemplary embodiment, the ethernet interface 201 is RJ45 internet interface;

The first isolating transformer T21, is used for separating a receiving data end of the ethernet interface 201 from the network signal receiving chip 202;

The second isolating transformer T22, is used for separating a sending data end of the ethernet interface 201 from the network signal receiving chip 202;

The first interference defending circuit 203, is used for defending common-mode interference and differential-mode interference of the receiving data end of the ethernet interface 201;

The second interference defending circuit 204, is used for defending common-mode interference and differential-mode interference of the sending data end of the ethernet interface 201;

The network signal processing chip 202, is used for processing the network signal.

In an exemplary embodiment, the receiving data end of the ethernet interface 201 is connected with a primary side of the first isolating transformer T21; the first interference defending circuit 203 is connected between a secondary side of the first isolating transformer T21 and the network signal receiving chip 202; the sending data end of the ethernet interface 201 is connected with a primary side of the second isolating transformer T22; the second interference defending circuit 204 is connected between a secondary side of the second isolating transformer T22 and the network signal receiving chip 202.

In detail, in an exemplary embodiment, the first interference defending circuit 203 includes a first catching diode ZD1, a second catching diode ZD2, a first resistor R1 and a second resistor R2. In the exemplary embodiment, resistance of the first resistor R1 and the second resistor R2 are both 2.2 ohms.

Wherein, an anode of the first catching diode ZD1 and an anode of the second catching diode ZD2 are both earthed; a cathode of the first catching diode ZD1 is connected with a first end of a secondary side coil (not labeled) of the first isolating transformer T21; a cathode of the second catching diode ZD2 is connected with a second end of the secondary side coil of the first isolating transformer T21; the cathode of the first catching diode ZD1 is also connected with a receiving data negative end RX2− of the network signal processing chip 202 through the first resistor R1; the cathode of the second catching diode ZD2 is also connected with a receiving data positive end RX2+ of the network signal processing chip 202 through the second resistor R2.

In an exemplary embodiment, the second interference defending circuit 204 includes a third catching diode ZD3, a fourth catching diode ZD4, a third resistor R3 and a fourth resistor R4. In the exemplary embodiment, resistance of the third resistor R3 and a fourth resistor R4 are both 2.2 ohms.

Wherein, an anode of the third catching diode ZD3 and an anode of the fourth catching diode ZD4 are both earthed; a cathode of the third catching diode ZD3 is connected with a first end of a secondary side coil (not labeled) of the second isolating transformer T22; a cathode of the fourth catching diode ZD4 is connected with a second end of the secondary side coil of the second isolating transformer T22; the cathode of the third catching diode ZD3 is also connected with a sending data negative end TX2− of the network signal processing chip 202 through the third resistor; the cathode of the fourth catching diode ZD4 is also connected with a sending data positive end TX2+ of the network signal processing chip 202 through the fourth resistor R4.

Furthermore, in an exemplary embodiment, the internet interface protecting circuit further includes a fifth resistor R5, a sixth resistor R6 and a first capacitor C1; a primary side coil of the first isolating transformer T21 includes a first primary coil and a second primary coil (not labeled); a primary side coil of the second isolating transformer T22 includes a third primary coil and a fourth primary coil (not labeled).

Wherein, a positive end RX+ of the receiving data end of the ethernet interface 201 is connected with a first end of the second primary coil of the first isolating transformer T21, a negative end RX− of the receiving data end of the ethernet interface 201 is connected with a first end of the first primary coil of the first isolating transformer T21; a second end of the first primary coil of the first isolating transformer T21 and a second end of the second primary coil of the first isolating transformer T21 are both connected with a first end of the first capacitor C1 through the fifth resistor R5; a second end of the first capacitor C1 is earthed; a positive end TX+ of the sending data end of the ethernet interface 201 is connected with a first end of the fourth primary coil of the second isolating transformer T22, a negative end TX− of the sending data end of the ethernet interface 201 is connected with a first end of the third primary coil of the second isolating transformer T22; a second end of the third primary coil of the second isolating transformer T22 and a second end of the fourth primary coil of the second isolating transformer T22 are both connected with the first end of the first capacitor C1 through the sixth resistor R6.

In addition, in an exemplary embodiment, the receiving data negative end RX2− of the network signal processing chip 202 defines a first static defending circuit 2021; the first static defending circuit 2021 has a first diode D1 and a second diode D2. Wherein, a cathode of the first diode D1 is connected with a working voltage input end VCC2 of the network signal processing chip 202, an anode of the first diode D1 is connected with the receiving data negative end RX2− of the network signal processing chip 202 and a cathode of the second diode D2 respectively; an anode of the second diode D2 is earthed;

The receiving data positive end RX2+ of the network signal processing chip 202 defines a second static defending circuit 2022; the second static defending circuit 2022 includes a third diode D3 and a fourth diode D4. Wherein, a cathode of the third diode D3 is connected with the working voltage input end VCC2 of the network signal processing chip 202, an anode of the third diode D3 is connected with the receiving data positive end RX2+ of the network signal processing chip 202 and a cathode of the fourth diode D4 respectively; an anode of the fourth diode D4 is earthed;

The sending data negative end TX2− of the network signal processing chip 202 defines a third static defending circuit 2023; the third static defending circuit 2023 includes a fifth diode D5 and a sixth diode D6. Wherein, a cathode of the fifth diode D5 is connected with the working voltage input end VCC2 of the network signal processing chip 202, an anode of the fifth diode D5 is connected with the sending data negative end TX2− of the network signal processing chip 202 and a cathode of the sixth diode D6 respectively; an anode of the sixth diode D6 is earthed;

The sending data positive end TX2+ of the network signal processing chip 202 defines a fourth static defending circuit 2024; the fourth static defending circuit 2024 includes a seventh diode D7 and a eighth diode D8. Wherein, a cathode of the seventh diode D7 is connected with the working voltage input end VCC2 of the network signal processing chip 202, an anode of the seventh diode D7 is connected with the sending data positive end TX2+ of the network signal processing chip 202 and a cathode of the eighth diode D8 respectively; an anode of the eighth diode D8 is earthed.

The working principle of the internet interface protecting circuit of the exemplary embodiment can be specifically described as follow: when a common-mode interference voltage exceeds a reverse breakdown voltage of the first catching diode ZD1 and the second catching diode ZD2 of the first interference defending circuit 203, the first catching diode ZD1 and the second catching diode ZD2 can be reversely conducted with each other, and clamp the voltage on the signal lines of the negative end RX− of the receiving data end and the positive end RX+ of the receiving data end of the ethernet interface 201 to remain at a lower voltage level, so that the following network signal processing chip 202 can be protected from being damaged; similarly, when a common-mode interference voltage exceeds the reverse breakdown voltage of the third catching diode ZD3 and the fourth catching diode ZD4 of the second interference defending circuit 204, the third catching diode ZD3 and the fourth catching diode ZD4 can be reversely conducted with each other, and the voltage on the signal lines of the negative end TX− of the sending data end and the positive end TX+ of the sending data end of the ethernet interface 201 can be clamped at a lower voltage level, for protecting the following network signal processing chip 202 from being damaged.

When a differential-mode interference voltage is applied to receiving data end of the ethernet interface 201, the first catching diode ZD1 in the first interference defending circuit 203 is the first to be reversely breakdown (as A and B points in the figure are both earthed), for forming current i3, the current i3 flows downstream and flows across the fourth diode D4 in the network signal processing chip 202 and the second catching diode ZD2 in the first interference defending circuit 203. Supposing that a forward conductive voltage of the fourth diode D4 drops to VD4, a forward conductive voltage of the second catching diode ZD2 is VZD2, if VZD2 is smaller than VD4, it is certain that the second catching diode ZD2 is preferably conducted, the fourth diode D4 is not conducting (at this time, current i3 in figure is equal to current i4), so that the fourth diode D4 can be protected. If VZD2 is larger than VD4, the fourth diode D4 is preferably conducted, while current following across the fourth diode D4 can be restricted to a certain current value i2 (the detail current), the exemplary embodiment only needs to set the second resistor R2 to have suitable resistance, for making that the current i2 flowing across the fourth diode D4 not to be too large, and so that the fourth diode D4 would not be burned up due to overcurrent, and then the fourth diode D4 can be protected, that is, the network signal processing chip 202 is protected. Simultaneously, in the exemplary embodiment, as the anode of the first catching diode ZD1 and the anode of the second catching diode ZD2 are both earthed, so, the first catching diode ZD1 and the second catching diode ZD2 can also have a protective effect for common-mode interference voltage. Similarly, when a differential-mode interference voltage is applied to sending data end of the ethernet interface 201, the second interference defending circuit 204 can also protect network signal processing chip 202.

The internet interface circuit of the exemplary embodiment includes the ethernet interface, the first isolating transformer, the second isolating transformer, the network signal processing chip, the first interference defending circuit and the second interference defending circuit; the ethernet interface is used for receiving and sending a network signal; the first isolating transformer is used for separating the receiving data end of the ethernet interface from the network signal receiving chip; the second isolating transformer is used for separating the sending data end of the ethernet interface from the network signal receiving chip; the first interference defending circuit is used for defending common-mode interference and differential-mode interference of the receiving data end of the ethernet interface; the second interference defending circuit is used for defending common-mode interference and differential-mode interference of the sending data end of the ethernet interface; the network signal processing chip is used for processing the network signal. Wherein, the receiving data end of the ethernet interface is connected with the primary side of the first isolating transformer; the first interference defending circuit is connected between the secondary side of the first isolating transformer and the network signal receiving chip; the sending data end of the ethernet interface is connected with the primary side of the second isolating transformer; the second interference defending circuit is connected between the secondary side of the second isolating transformer and the network signal receiving chip. The internet interface protecting circuit of the exemplary embodiment can defend the common-mode interference and differential-mode interference; and the cost of the internet interface protecting circuit of the present disclosure is low; simultaneously, the present disclosure also has the advantages of simple circuit structure, and easily to be achieved.

The present disclosure also provides a television, the television includes an internet interface protecting circuit, the circuit structure and the working principle of the internet interface protecting circuit can be referred to the above exemplary embodiments, no need to repeat again. It is to be understood that, as the television of the exemplary embodiment adopts the technical proposal of the above internet interface protecting circuit, the television should has all of the beneficial effects of the internet interface protecting circuit.

The embodiments above are preferably embodiments of the present disclosure, and the present disclosure is not limited to such embodiments, equivalent structure conversion based on the specification and the drawing of the present disclosure, or directly or indirectly used in other related technical field, both similarly within the protection scope of the present disclosure.

What is claimed is:

1. An internet interface protecting circuit, comprising an ethernet interface, a first isolating transformer, a second isolating transformer, a network signal processing chip, and a first interference defending circuit; wherein,
the ethernet interface, is used for receiving and sending a network signal;
the first isolating transformer, is used for separating a receiving data end of the ethernet interface from the network signal receiving chip;
the second isolating transformer, is used for separating a sending data end of the ethernet interface from the network signal receiving chip;
the first interference defending circuit, is used for defending common-mode interference and differential-mode interference of the receiving data end of the ethernet interface;
the network signal processing chip, is used for processing the network signal;
the receiving data end of the ethernet interface is connected with a primary side of the first isolating transformer; the first interference defending circuit is connected between a secondary side of the first isolating transformer and the network signal receiving chip; the sending data end of the ethernet interface is connected with a primary side of the second isolating transformer; a secondary side of the second isolating transformer is connected with the network signal processing chip; wherein the first interference defending circuit comprises a first catching diode, a second catching diode, a first resistor, and a second resistor, and wherein an anode of the first catching diode and an anode of the second catching diode are both earthed; a cathode of the first catching diode is connected to a first end of a secondary side coil of the first isolating transformer; a cathode of the second catching diode is connected to a second end of the secondary side coil of the first isolating transformer; the cathode of the first catching diode is also connected to a receiving data negative end of the network signal processing chip through the first resistor; the cathode of the second catching diode is also connected to a receiving data positive end of the network signal processing chip through the second resistor.

2. The internet interface protecting circuit according to claim 1, wherein the internet interface protecting circuit further comprises a second interference defending circuit which is used for defending common-mode interference and differential-mode interference of the sending data end of the ethernet interface; the second interference defending circuit is connected between the secondary side of the second isolating transformer and the network signal receiving chip.

3. The internet interface protecting circuit according to claim 2, wherein the second interference defending circuit comprises a third catching diode, a fourth catching diode, a third resistor and a fourth resistor; wherein,
   an anode of the third catching diode and an anode of the fourth catching diode are both earthed; a cathode of the third catching diode is connected with a first end of a secondary side coil of the second isolating transformer; a cathode of the fourth catching diode is connected with a second end of the secondary side coil of the second isolating transformer; the cathode of the third catching diode is also connected with a sending data negative end of the network signal processing chip through the third resistor; the cathode of the fourth catching diode is also connected with a sending data positive end of the network signal processing chip through the fourth resistor.

4. The internet interface protecting circuit according to claim 3, wherein the internet interface protecting circuit further comprises a fifth resistor, a sixth resistor and a first capacitor; a primary side coil of the first isolating transformer comprises a first primary coil and a second primary coil; a primary side coil of the second isolating transformer comprises a third primary coil and a fourth primary coil; wherein,
   a positive end of the receiving data end of the ethernet interface is connected with a first end of the second primary coil, a negative end of the receiving data end of the ethernet interface is connected with a first end of the first primary coil; a second end of the first primary coil and a second end of the second primary coil are both connected with a first end of the first capacitor through the fifth resistor; a second end of the first capacitor is earthed;
   a positive end of the sending data end of the ethernet interface is connected with a first end of the fourth primary coil, a negative end of the sending data end of the ethernet interface is connected with a first end of the third primary coil; a second end of the third primary coil and a second end of the fourth primary coil are both connected with the first end of the first capacitor through the sixth resistor.

5. The internet interface protecting circuit according to claim 4, wherein the receiving data negative end of the network signal processing chip defines a first static defending circuit; the first static defending circuit comprises a first diode and a second diode; wherein,
   a cathode of the first diode is connected with a working voltage input end of the network signal processing chip, an anode of the first diode is connected with the receiving data negative end of the network signal processing chip and a cathode of the second diode respectively; an anode of the second diode is earthed.

6. The internet interface protecting circuit according to claim 5, wherein the receiving data positive end of the network signal processing chip defines a second static defending circuit; the second static defending circuit comprises a third diode and a fourth diode; wherein,
   a cathode of the third diode is connected with the working voltage input end of the network signal processing chip, an anode of the third diode is connected with the receiving data positive end of the network signal processing chip and a cathode of the fourth diode respectively; an anode of the fourth diode is earthed.

7. The internet interface protecting circuit according to claim 6, wherein the sending data negative end of the network signal processing chip defines a third static defending circuit; the third static defending circuit comprises a fifth diode and a sixth diode; wherein,
   a cathode of the fifth diode is connected with the working voltage input end of the network signal processing chip, an anode of the fifth diode is connected with the sending data negative end of the network signal processing chip and a cathode of the sixth diode respectively; an anode of the sixth diode is earthed.

8. The internet interface protecting circuit according to claim 7, wherein the sending data positive end of the network signal processing chip defines a fourth static defending circuit; the fourth static defending circuit comprises a seventh diode and a eighth diode; wherein,
   a cathode of the seventh diode is connected with the working voltage input end of the network signal processing chip, an anode of the seventh diode is connected with the sending data positive end of the network signal processing chip and a cathode of the eighth diode respectively; an anode of the eighth diode is earthed.

9. A television, comprising an internet interface protecting circuit, the internet interface protecting circuit comprising an ethernet interface, a first isolating transformer, a second isolating transformer, a network signal processing chip, and a first interference defending circuit; wherein,
   the ethernet interface, is used for receiving and sending a network signal;
   the first isolating transformer, is used for separating a receiving data end of the ethernet interface from the network signal receiving chip;
   the second isolating transformer, is used for separating a sending data end of the ethernet interface from the network signal receiving chip;
   the first interference defending circuit, is used for defending common-mode interference and differential-mode interference of the receiving data end of the ethernet interface;
   the network signal processing chip, is used for processing the network signal;
   the receiving data end of the ethernet interface is connected with a primary side of the first isolating transformer; the first interference defending circuit is connected between a secondary side of the first isolating transformer and the network signal receiving chip; the sending data end of the ethernet interface is connected with a primary side of the second isolating transformer; a secondary side of the second isolating transformer is connected with the network signal processing chip; wherein the first interference defending circuit comprises a first catching diode, a second catching diode, a first resistor, and a second resistor, and wherein an anode of the first catching diode and an anode of the second catching diode are both earthed; a cathode of the first catching diode is connected to a first end of a secondary side coil of the first isolating transformer; a cathode of the second catching diode is connected to a second end of the secondary side coil of the first isolating transformer; the cathode of the first catching diode is also connected to a receiving data negative end of the network signal processing chip through the first resistor; the cathode of the second catching diode is also connected to a receiving data positive end of the network signal processing chip through the second resistor.

10. The television according to claim 9, wherein the internet interface protecting circuit further comprises a second interference defending circuit which is used for defending common-mode interference and differential-mode interference of the sending data end of the ethernet interface; the second interference defending circuit is connected between the secondary side of the second isolating transformer and the network signal receiving chip.

11. The television according to claim 10, wherein the second interference defending circuit comprises a third catching diode, a fourth catching diode, a third resistor and a fourth resistor; wherein, an anode of the third catching diode and an anode of the fourth catching diode are both earthed; a cathode of the third catching diode is connected with a first end of a secondary side coil of the second isolating transformer; a cathode of the fourth catching diode is connected with a second end of the secondary side coil of the second isolating transformer; the cathode of the third catching diode is also connected with a sending data negative end of the network signal processing chip through the third resistor; the cathode of the fourth catching diode is also connected with a sending data positive end of the network signal processing chip through the fourth resistor.

12. The television according to claim 11, wherein the internet interface protecting circuit further comprises a fifth resistor, a sixth resistor and a first capacitor; a primary side coil of the first isolating transformer comprises a first primary coil and a second primary coil; a primary side coil of the second isolating transformer comprises a third primary coil and a fourth primary coil; wherein, a positive end of the receiving data end of the ethernet interface is connected with a first end of the second primary coil, a negative end of the receiving data end of the ethernet interface is connected with a first end of the first primary coil; a second end of the first primary coil and a second end of the second primary coil are both connected with a first end of the first capacitor through the fifth resistor; a second end of the first capacitor is earthed;

a positive end of the sending data end of the ethernet interface is connected with a first end of the fourth primary coil, a negative end of the sending data end of the ethernet interface is connected with a first end of the third primary coil; a second end of the third primary coil and a second end of the fourth primary coil are both connected with the first end of the first capacitor through the sixth resistor.

13. The television according to claim 12, wherein the receiving data negative end of the network signal processing chip defines a first static defending circuit; the first static defending circuit comprises a first diode and a second diode; wherein, a cathode of the first diode is connected with a working voltage input end of the network signal processing chip, an anode of the first diode is connected with the receiving data negative end of the network signal processing chip and a cathode of the second diode respectively; an anode of the second diode is earthed.

14. The television according to claim 13, wherein the receiving data positive end of the network signal processing chip defines a second static defending circuit; the second static defending circuit comprises a third diode and a fourth diode; wherein, a cathode of the third diode is connected with the working voltage input end of the network signal processing chip, an anode of the third diode is connected with the receiving data positive end of the network signal processing chip and a cathode of the fourth diode respectively; an anode of the fourth diode is earthed.

15. The television according to claim 14, wherein the sending data negative end of the network signal processing chip defines a third static defending circuit; the third static defending circuit comprises a fifth diode and a sixth diode; wherein, a cathode of the fifth diode is connected with the working voltage input end of the network signal processing chip, an anode of the fifth diode is connected with the sending data negative end of the network signal processing chip and a cathode of the sixth diode respectively; an anode of the sixth diode is earthed.

16. The television according to claim 15, wherein the sending data positive end of the network signal processing chip defines a fourth static defending circuit; the fourth static defending circuit comprises a seventh diode and a eighth diode; wherein, a cathode of the seventh diode is connected with the working voltage input end of the network signal processing chip, an anode of the seventh diode is connected with the sending data positive end of the network signal processing chip and a cathode of the eighth diode respectively; an anode of the eighth diode is earthed.

\* \* \* \* \*